United States Patent

Fisher

[15] 3,649,187
[45] Mar. 14, 1972

[54] CORROSION RESISTANT APPARATUS

[72] Inventor: Arthur Orman Fisher, Richmond Heights, Mo.

[73] Assignee: Monsanto Company, St. Louis, Mo.

[22] Filed: Feb. 9, 1970

[21] Appl. No.: 9,762

[52] U.S. Cl. ..............................23/167, 23/252 A, 23/261, 75/171
[51] Int. Cl. ......................................................C01b 17/48
[58] Field of Search .....................75/171, 170; 148/32, 32.5; 23/167, 261, 252 A

[56] References Cited

UNITED STATES PATENTS

| | | | |
|---|---|---|---|
| 2,900,252 | 8/1959 | Woodward | 75/171 |
| 1,115,239 | 10/1914 | Parr | 75/171 |
| 1,912,832 | 6/1923 | Fairlie | 23/252 A |

Primary Examiner—Richard O. Dean
Attorney—John L. Young, James W. Williams, Jr. and Neal E. Willis

[57] ABSTRACT

Apparatus fabricated from an alloy comprising copper in the amount of from about 1 to about 10 percent by weight, chromium in the amount of from about 15 to about 35 percent by weight beryllium in the amount of from about 0.1 to about 0.5 percent by weight and nickel in the amount of from about 55 to about 84 percent by weight has high-corrosion resistance when used in contact with sulfuric acid in concentrations of from about 50 to about 90 percent by weight. The apparatus is particularly useful in a process for removal of sulfur dioxide from flue gas and its conversion to sulfuric acid. Example of the apparatus include mist eliminators, wire mesh, piping, tubing, liners, wire bracing, rods, trays, wire screens, reinforcing members, support members, diaphragms and other apparatus being wholly or partly, relatively thin in cross section and having relatively large surface areas exposed to, or subject to exposure to, sulfuric acid in concentrations from about 50 percent to about 90 percent by weight.

13 Claims, 4 Drawing Figures

PATENTED MAR 14 1972　　　　　　　　　　　　　　　　　　　　3,649,187
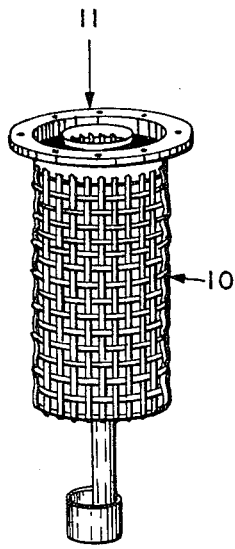
FIGURE 1
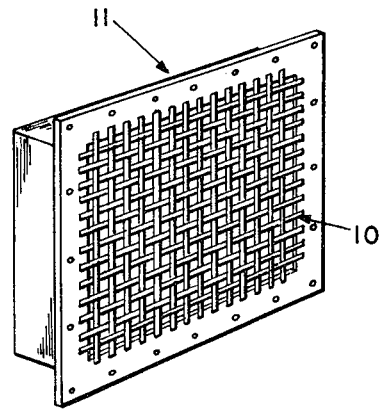
FIGURE 2
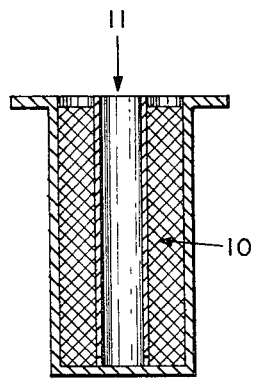
FIGURE 3
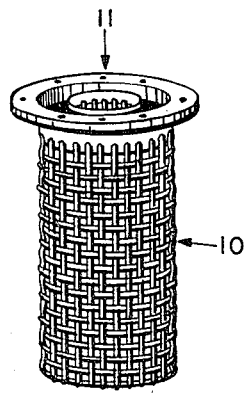
FIGURE 4
INVENTOR
ARTHUR ORMAN FISHER
BY 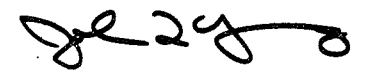
AGENT FOR APPLICANT

CORROSION RESISTANT APPARATUS

FIELD OF THE INVENTION

The present invention relates to apparatus for use in contact with sulfuric acid in moderate concentrations of from about 50 percent to about 90 percent.

DESCRIPTION OF THE PRIOR ART

In the current efforts to reduce the spoilage of man's present environment, attention has become focused on the contribution to air pollution by sulphur dioxide emissions. Extensive research and technical efforts have been directed toward the reduction of the sulfur dioxide content of the flue gas of power generating stations and other industrial facilities. A particularly attractive approach has been to convert the gaseous sulfur dioxide to sulfuric acid and thus transform a hazardous pollutant into a useful industrial chemical. While such a process offers great potential benefit in eliminating this vexatious pollution problem, it also poses difficult materials selection problems for the process design engineer who must balance corrosion resistance, physical strength and cost along with the capability of a given material to be fabricated into the necessary configuration. The grates, screens, supports, wires, pipes, plates, covers, absorbers, scrubbers, converters, precipitators, heat exchangers, preheaters, mist eliminators, vents, stacks and stack liners, piping, tubing, bracing, rods, trays and tray assemblies, reinforcing members, fastening devices instruments and instrument parts such as thermometer wells, sample tubes, diaphragms, etc., and other apparatus useful in such a process must exhibit good resistance to corrosion from sulfuric acid in concentrations from about 50 to about 90 percent by weight, exhibit good strength and rigidity over a range of temperatures and particularly at temperatures in excess of 175° F., and have a reasonable material cost. Because of the wide variety of shapes and forms of the above apparatus it is necessary that the material from which such apparatus is made have the capability also of being drawn, forged, and fabricated. While many corrosion resistant alloys exist which can meet one or more of the above criteria, none of the materials known in the prior art can provide the proper balance of properties needed to fabricate apparatus with satisfactory strength and corrosion resistance when exposed to 50 to 90 percent sulfuric acid at temperatures in excess of 175° F.

Lead is outstanding in its resistance to sulfuric acid attack. However, its softness and low strength result in poor durability, especially at elevated temperatures. Alloys of lead improve certain characteristics but have not been successful in improving the creep resistance and strength sufficiently for use in fabricating apparatus with adequate service life.

Carbon steel and standard stainless steels possess the needed strength and can be fabricated into the proper configurations but exhibit inadequate corrosion resistance to this concentration of acid. Further it is noted that corrosion resistance declines as temperatures increases.

Specialty stainless steels with good strength and adequate corrosion resistance are high priced or are suitable only for producing cast articles. Thus, apparatus fabricated from such alloys is costly because of the high price of the alloy, the expense of fabrication or the combination of these two factors. In certain instances, it is necessary to design equipment to conform to the limitations in configuration of apparatus caused by material limitations. These considerations limit process design freedom and result in less than optimum process design efficiency. Optimum efficiency is the goal of any industrial process, but high efficiency is particularly needed in new air-pollutant removal processes so that they may perform their vital function at the lowest possible cost.

It is known that materials, such as lead and lead alloys, which are resistant to dilute sulfuric acid, up to about 50 percent by weight, are attacked readily by concentrated sulfuric acid, over 80 percent by weight. Conversely mild steel is widely employed in a concentrated sulfuric acid environment but is immediately and rapidly corroded when exposed to dilute sulfuric acid. Thus, there are relatively few alloys available which can be used in contact with sulfuric acid in the moderate sulfuric acid concentration range, from about 50 percent by weight to about 90 percent by weight. At the lower end of the concentration range the acid acts like a dilute acid while at the upper end it acts like a concentrated acid. One of the alloys recommended for service where exposed to sulfuric acid in moderate concentrations is

| | |
|---|---|
| Nickel | 29% |
| Chromium | 20% |
| Copper | 3% |
| Molybdenum | 2% |
| Iron | 43% |
| Other | 3% |

Although available in both cast and wrought form, the above alloy is not suitable for use, when exposed to sulfuric acid in concentrations of from about 50 to about 90 percent by weight, at temperatures above 150° F.

An improved version of the above alloy has been developed which exhibits increased corrosion resistance to sulfuric acid attack particularly in acid concentrations of from about 10 to about 40 percent by weight. Its composition is:

| | |
|---|---|
| Nickel | 30% to 38% |
| Chromium | 19% to 21% |
| Copper | 3% to 4% |
| Molybdenum | 2% to 3% |
| Iron | 31% to 43% |
| Manganese | 2% |
| Other | 1% |

Although showing an improvement over the prior alloy in resistance to corrosion by sulfuric acid in concentrations of from about 50 to about 90 percent by weight even at temperatures as high as 175° F., it is still not suitable for use at above 175° F. in sulfuric acid environments with concentrations from about 60 to about 80 percent by weight. In this sulfuric acid concentration range there is a sharp drop in resistance to corrosion. This drop in corrosion resistance is typical of many alloys and, depending on the alloy composition, usually occurs somewhere in the sulfuric acid concentration range from about 60 to about 90 percent by weight.

The following alloy

| | |
|---|---|
| Nickel | 60% |
| Molybdenum | 18% |
| Chromium | 18% |
| Iron | 3% |
| Other | 1% | is suitable for use, when exposed to sulfuric acid in concentrations of from about 50 to about 90 percent by weight, at temperatures up to about 150° F., but above 150° F. it cannot be used in contact with sulfuric acid in concentrations of from about 70 to about 90 percent by weight.

A much more costly alloy has been found to have good resistance to sulfuric acid in concentrations from about 50 to about 90 percent by weight at temperatures above 175° F. Its composition is as follows:

| | |
|---|---|
| Nickel | 60% to 62% |
| Molybdenum | 32% |
| Iron | 3% to 6% |
| Other | 2% to 3% |

However, in the presence of oxygen it is rapidly attacked by the acid. Likewise, in the presence of oxidizing agents, even at a level of 0.1 percent, its corrosion resistance is very poor and the alloy is not suitable for use under such conditions. Accordingly, the combination of high-material cost and the need to exclude oxygen from the environment limits the usefulness of this alloy in commercial operations.

Thus, there is an immediate need for apparatus which is resistant to sulfuric acid in concentrations of from about 50 to about 90 percent at temperatures in excess of about 175° F. and which can be readily fabricated by forming drawing, rolling, forging, or other techniques from an alloy of reasonable cost.

SUMMARY OF THE INVENTION

This invention comprises apparatus for use in contact with sulfuric acid in concentrations of from about 50 to about 90 percent by weight which apparatus is fabricated from an alloy comprising copper in the amount of from about 1 to about 10 percent by weight, chromium in the amount of from about 15 to about 35 percent by weight and nickel in the amount of from about 55 to about 84 percent by weight.

BRIEF DESCRIPTION OF DRAWING

FIG. 1 is a perspective view of a mist eliminator element, which is a preferred type of apparatus of this invention.

FIG. 2 is a perspective view of another mist eliminator element, which is also a preferred type of apparatus of this invention.

FIG. 3 is a transverse, vertical, sectional view of a filter element, which is also a preferred type of apparatus of this invention.

FIG. 4 is a perspective view of a coalescer element, which is also a preferred type of apparatus of this invention.

DETAILED DESCRIPTION

Apparatus of this invention includes containers, vessels, reactors, fractionaters, absorbers, scrubbers, converters, precipitators, heat exchangers, preheaters, mist eliminators, vents, stacks and stack liners, piping, tubing, wire bracing, rods, trays and tray assemblies, reinforcing members, wire screens, fastening devices instruments and instrument parts such as thermometer wells, sample tubes, diaphragms, etc., shipping and sample vessels, supports, pumps and pump parts such as bearing housings, impellers, etc., fans, compressors, agitators and the like apparatus having portions thereof in contact with from about 50 to about 90 percent by weight sulfuric acid.

Preferred apparatus of this invention includes containers, vessels, heat exchangers, preheaters, mist eliminators, vents, stacks and stack liners, piping, tubing, wire bracing, rods, trays and tray assemblies, reinforcing members, wire screens, fastening devices, support members, instruments and instrument parts such as thermometer wells, sample tubes, diaphragms, etc., which are exposed to or subject to exposure to, on all surfaces and edges, or completely immersed in, or subject to complete immersion in, sulfuric acid in concentrations from about 50 percent to about 90 percent by weight.

More preferred apparatus includes liners, piping, tubing, wire bracing rods, trays, wire screens, reinforcing members, support members, diaphragms and other apparatus being wholly or partly, relatively thin in cross section and having relatively large surface areas exposed to, or subject to exposure to, sulfuric acid in concentrations from about 50 percent to about 90 percent by weight. In the drawing FIGS. 1 to 4 are illustrative examples of apparatus being partly thin in cross section and having relatively large surface areas subject to exposure to sulfuric acid in concentrations from about 50 percent to about 90 percent by weight. In each of the figures the numeral 10 identifies a wire mesh portion of the device which supports a fiber element. The numeral 11 identifies a base element by which the device is connected to another piece of apparatus or a support. The wire mesh portion is relatively thin in cross section and subject to exposure to sulfuric acid in concentrations from about 50 percent to about 90 percent by weight. Since the wire is drawn before it is fabricated into mesh and must possess high strength and rigidity, it cannot be made from prior art materials sufficiently resistant to sulfuric acid attack. Available high-strength alloys are deficient in ductility so that wire cannot be drawn from them economically. Lead and lead alloys are deficient in strength and rigidity so wire mesh made from them is not suitable for this application. Alloys which are suitable for fabrication of wire mesh possess inadequate corrosion resistance for this type of environment. However, the alloy of this invention is a satisfactory material for both the wire mesh and base with excellent corrosion resistance in this environment.

The corrosivity of sulfuric acid varies with its concentration, temperature, movement of the acid relative to the surface attacked, and the presence or absence of free oxygen and oxidizing agents in or with the acid.

Apparatus of this invention are particularly suited for extended use in contact with sulfuric acid in concentrations from about 50 percent by weight to about 90 percent by weight. In cleaning or flushing equipment the sulfuric acid concentration contacting said apparatus may decline as low as 1 percent by weight. During unusual process operations the acid concentration may exceed 98 percent by weight. Even under such extreme conditions the apparatus of this invention exhibits corrosion resistance. Likewise the apparatus exhibits remarkable corrosion resistance under the most severe corrosion conditions which normally occur from about 70 and to about 80 percent by weight concentration of sulfuric acid. Excellent corrosion resistance of the apparatus is found when the apparatus is exposed to concentrations of sulfuric acid ranging from about 60 percent to about 90 percent by weight. Further it is to be noted that the high level of corrosion resistance of the apparatus of this invention in contact with sulfuric acid is also exhibited by the apparatus in contact with phosphoric acid in concentrations ranging from about 10 to about 100 percent by weight over a wide range of temperatures.

As corrosivity of sulfuric acid at any given concentration increases with temperature, the corrosion resistance of the apparatus of this invention also declines as temperature increases. However, the decline in corrosion resistance of this apparatus is less than the decline in corrosion resistance of apparatus made from alloys known in the prior art so that at 175° F. and above there is a remarkable difference between corrosion resistance of the apparatus of this invention and that of the prior art. This remarkable difference is also apparent at 200° F. as well as at 225° F. even at highly corrosive sulfuric acid concentrations of from about 70 to about 80 percent by weight.

Under static conditions corrosion is not as severe as when the sulfuric acid is moving relative to the surface of the apparatus. The faster the relative movement of the acid the greater its corrosivity. The apparatus of this invention exhibits high resistance to corrosion even when the sulfuric acid moves, relative to the apparatus surface, at high velocity as well as when there is no relative movement. This resistance to sulfuric acid corrosion at high-relative velocities at elevated temperature is particularly important for apparatus used in processes to remove sulfur dioxide from flue gas and to convert the sulfur dioxide to sulfuric acid.

Likewise, the presence of oxygen or oxidizing agents increases the corrosivity of any given concentration of sulfuric acid in the 50 to 90 percent by weight concentration range. The apparatus of this invention shows good corrosion resistance whether or not oxygen or oxidizing agents are present in or with the sulfuric acid. This attribute of the present apparatus is also important when the apparatus is used in a process to remove sulfur dioxide from flue gas and convert the sulfur dioxide to sulfuric acid.

The alloy from which apparatus of this invention is made comprises copper in the amount of from about 1 to about 10 percent by weight, chromium in the amount of from about 15 to about 35 percent by weight and nickel in the amount of from about 55 to about 84 percent by weight.

Neither of these metals, such as nickel, chromium or copper alone or any two of them in combination provide the combination of cost, corrosion resistance, ductility and strength needed for fabrication of the apparatus of this invention. It has been found, however, that when these three elements are combined in the described ratio in accordance with the practice of this invention, unusual and unexpected properties are developed which for the first time enables the successful use of the alloy in apparatus in contact with sulfuric acid in concentrations of from about 50 to about 90 percent by weight at temperatures above 175° F. and in the presence of oxygen.

Copper constitutes one of the important components in the alloy system. When less than one percent by weight of copper is present in the alloy the unexpected properties of the alloy are lost. Corrosion by the sulfuric acid proceeds at a rapid rate. The use of copper in amounts greater than 10 percent by weight results in an undesirable decrease in the melting point of the alloy.

When less than 15 percent by weight of chromium is present, resistance to oxidation is markedly decreased. If more than 35 percent of chromium is present in the alloy, the alloy becomes so hard and brittle as to militate against economical manufacture into the desired drawn or forged shapes. The structure formed becomes deficient in its chemical properties, and even in its physical properties, and the material cannot be formed into intricate structures in an economical manner.

It is more preferred to make apparatus of this invention from an alloy comprising copper in the amount of from about 3 to about 6 percent by weight, chromium in the amount of from about 20 to about 30 percent by weight and nickel in the amount of from about 64 to about 77 percent by weight. Still more preferred, where extra corrosion resistance is at a premium, beryllium in the amount of about 0.1 to about 0.5 percent by weight may be added to the alloy. Beryllium, in small quantities, is found to increase corrosion resistance and hardness of the alloy. The small increase in corrosion resistance of the alloy by the additional presence of beryllium is justified economically where the apparatus is small in size and subject to sulfuric acid attack from all sides or where the apparatus is relatively very thin in cross section.

Molybdenum, although present in many known corrosion resistant alloys, when present in the apparatus of this invention, is found to detract from its resistance to attack by sulfuric acid in moderate concentrations. Iron in amounts greater than 0.1 percent by weight also appears to detract from the properties of the alloy with the result that it is preferred to consider molybdenum, iron and possibly manganese and magnesium as undesirable impurities.

A composition of the type described, embodying features of this invention, has been found to be characterized by properties which enable working such as casting, forging, hot-rolling, drawing and the like into complicated shapes. One method of fabricating comprises the preparation first of a virgin cast and then remelting and recasting the initial product into the desired final product.

More particularly, in preparing a melt as of 7,070 grams, the nickel and chromium are melted together in a suitable refractory crucible which may be heated, as by electrical means. This operation does not necessarily require an inert atmosphere and may therefore be carried out in air. When the melt forms, addition is made of a deoxidizing agent of the conventional type used in metallurgical practice. Good results are obtained by the use of a deoxidizing agent having the following composition in percent by weight:

59 percent silicon
20 percent calcium
18 percent manganese
3 percent inert matter After adding 40 grams of the deoxidizer, heating is continued for about 30 seconds after which the copper is added. Following another heating period an additional 20 grams of the deoxidizer is added and the melt poured to form billets.

To prepare a final casting of 4,200 grams, the billet is cut into scrap for remelting. When the melt is reduced to condition for pouring, about 10 grams of the deoxidizer are added and heating is continued for about 2 minutes. Finally, after the heat is turned off, 10 grams of another deoxidizer formed of equal parts by weight of nickel and magnesium are added and the melt may be poured for casting into suitable molds or, in the alternative, the melt may be poured into a blank for forging or the like.

While the deoxidizing agent remains behind as a slag in the melting crucible, some of the slag will find its way into the product to form an impurity. These impurities are chiefly those selected from the group of elements consisting of silicon, iron, manganese, magnesium and calcium, present in the fluxes or deoxidizing agents although others may be present. Ordinarily, the total amount of impurities should not be greater than 1.5 percent and preferably not greater than 1.0 percent by weight. Not more than 0.5 percent of any one impurity should be present.

To illustrate the remarkable corrosion resistance of apparatus of this invention, seven flat test specimens from various apparatus of this invention are immersed in chemically pure sulfuric acid diluted with distilled water to a concentration of 78 percent by weight for a period of 120 hours at 225° F. along with similar specimens of apparatus made from known corrosion resistant alloys. At the end of the immersion period sulfuric acid attack upon each of the specimens is noted and the extent of attack is reported in terms of mils of metal removed per year.

The results, listed in Table I, show with one exception, sample 25, that apparatus of this invention under these conditions have improved corrosion resistance by from about 20 percent to about several hundred percent when compared to apparatus made from known corrosion resistant alloys.

Additional specimens are placed within a vessel in a pilot plant process for removing sulfur dioxide from the air and converting it to sulfuric acid. The vessel is maintained at 225°±5 F. and is partially filled with impure sulfuric acid of about 78 percent concentration by weight. The impurities include both sulfates which retard corrosion as well as chlorides which increase corrosion. Oxygen is present in the gaseous phase. The specimens are placed at random locations within the vessel where they are subject to intermittent splashing by and immersion in the acid. During the test period of 782 hours the acid is in almost continuous movement relative to the specimens at a wide range of velocities. At the end of the test period sulfuric acid attack upon each of the specimens is noted and the extent of attack is reported in terms of mils of metal removed per year. The results listed in Table II show that apparatus of this invention under plant operating conditions have improved corrosion resistance by from about 20 percent to about several hundred percent when compared to apparatus made from known corrosion resistant alloys. The alloy of sample 25, which in the static immersion test appears to have greatly superior corrosion resistance when compared to the alloys useful in this invention, is severely attacked by sulfuric acid under plant operating conditions as shown by sample 45 which is calculated to have more than five times the annual loss of samples 28 to 31 which are specimens of the apparatus of this invention.

In view of the outstanding corrosion resistance displayed by specimens of apparatus of this invention, it is evident that the use of the apparatus of this invention in any process wherein said apparatus is in contact with sulfuric acid in concentrations of from about 50 to about 90 percent by weight would constitute an improvement in such a process. The surprising level of corrosion resistance of apparatus of this invention consisting essentially of copper in the amount of from about 1 to about 10 percent by weight, chromium in the amount of from about 15 to about 35 percent by weight, nickel in the amount of from about 55 to about 84 percent by weight and beryllium in the amount of from 0 to about 0.5 percent by weight in contact with said concentrations of liquid sulfuric acid, particularly at temperatures higher than about 175° F., increases process efficiency by prolonged service life of the apparatus which increases on-stream time and minimizes maintenance downtime. Such improved efficiency is most apparent where movement of sulfuric acid in said concentrations across contact surfaces and apparatus as described herein occurs. Such movement may be intermittent or relatively constant and at a low, high or variable velocity. Examples of processes in which such acid movement occurs include but are not limited to a catalytic oxidation process of converting sulfur dioxide to sulfuric acid, a spent acid recovery process, a process for transmitting and storing sulfuric acid at concentrations of from about 50 to about 90 percent by weight, a process for treating articles with sulfuric acid wherein said acid may be channeled, sprayed, or directed from place to place by apparatus of this invention, etc. In any of these processes, fabricated apparatus and contact surfaces as described herein which are in contact with or subject to be in contact with sulfuric acid in the concentrations described in this specification give improved service life when compared to apparatus of the prior art which results in improved process efficiency and lower maintenance costs.

Various modifications and equivalents will be apparent to one skilled in the art and may be made in the compositions and apparatus of the present invention without departing from the spirit and scope thereof, and it is therefore to be understood that the invention is to be limited only by the scope of the appended claims.

TABLE I

| Sample | % Composition | | | | | | Corrosion in mils per year |
|---|---|---|---|---|---|---|---|
| | Cr | Ni | Cu | Mo | Fe | Other | |
| 1 | 30 | 67 | 3 | — | — | — | 42 |
| 2 | 31 | 65 | 4 | — | — | — | 56 |
| 3 | 31 | 65 | 4 | — | — | — | 36 |
| 4 | 30 | 62 | 8 | — | — | — | 71 |
| 5 | 34 | 61 | 5 | — | — | — | 57 |
| 6 | 26 | 69 | 5 | — | — | — | 34 |
| 7 | 26 | 68.5 | 5 | — | — | 0.5(Be) | 31 |
| 8 | 30 | 65 | — | 5 | — | — | 392 |
| 9 | 30 | 65 | — | 5 | — | — | 189 |
| 10 | 20 | 35 | — | — | 45 | — | 2066 |
| 11 | 22.5 | 58 | 6.5 | 6.5 | 6.5 | — | 94 |
| 12 | 50 | 50 | — | — | — | — | 2000 |
| 13 | 22 | 60 | — | 9 | — | 4 | 159 |
| 14 | 18 | 8 | — | — | 74 | — | 4412 |
| 15 | 18 | 12 | — | 2.5 | 67.5 | — | 2408 |
| 16 | 20 | 34 | 3.5 | 2.5 | 39 | 1 | 87 |
| 17 | 20 | 34 | 3.5 | 2.5 | 39 | 1 | 175 |
| 18 | 28 | 8 | 3 | 2 | 59 | — | 3386 |
| 19 | 26.5 | 4 | 1.5 | — | 68 | — | 3758 |
| 20 | 25 | 5 | — | — | 70 | — | 1541 |
| 21 | 25.5 | 5.5 | 3 | 2 | 64 | — | 3795 |
| 22 | 23 | 13 | — | — | 64 | — | 3105 |
| 23 | 20 | 7 | 3 | — | 62 | 8 | 4669 |
| 24 | 20 | 13 | — | — | 67 | — | 3764 |
| 25 | — | 67 | — | 28 | 5 | — | 2 |
| 26 | 15.5 | 59 | — | 16 | 5.5 | 4 | 166 |
| 27 | 26 | 5.5 | 0.5 | 2 | 66 | — | 3996 |

TABLE II

| Sample | % Composition | | | | | | Corrosion in mils per year |
|---|---|---|---|---|---|---|---|
| | Cr | Ni | Cu | Mo | Fe | Other | |
| 28 | 31 | 65 | 4 | — | — | — | 9 |
| 29 | 34 | 61 | 5 | — | — | — | 9 |
| 30 | 26 | 69 | 5 | — | — | — | 5 |
| 31 | 26 | 68.5 | 5 | — | — | 0.5(Be) | 4 |
| 32 | 30 | 65 | — | 5 | — | — | 14 |
| 33 | 30 | 65 | — | 5 | — | — | 15 |
| 34 | 22.5 | 58 | 6.5 | 6.5 | 6.5 | — | 11 |
| 35 | 50 | 50 | — | — | — | — | 23 |
| 36 | 18 | 8 | — | — | 74 | — | 371 |
| 37 | 18 | 12 | — | 2.5 | 67.5 | — | 444 |
| 38 | 20 | 34 | 3.5 | 2.5 | 39 | 1 | 11 |
| 39 | 20 | 34 | 3.5 | 2.5 | 39 | 1 | 12 |
| 40 | 28 | 8 | 3 | 2 | 59 | — | 36 |
| 41 | 26.5 | 4 | 1.5 | — | 68 | — | 99 |
| 42 | 25 | 5 | — | — | 70 | — | 18 |
| 43 | 25.5 | 5.5 | 3 | 2 | 64 | — | 21 |
| 44 | 23 | 13 | — | — | 64 | — | 29 |
| 45 | 20 | 7 | 3 | — | 62 | 8 | 447 |
| 46 | | 13 | — | — | 67 | — | 58 |
| 47 | 20 | 67 | — | 28 | 5 | — | 45 |
| 48 | 15.5 | 59 | — | 16 | 5.5 | 4 | 15 |
| 49 | 26 | 5.5 | 0.5 | 2 | 66 | — | 75 |
| 50 | Mild Steel | | | | | | 169 |
| 51 | Chemical Lead | | | | | | 45 |

I claim:

1. Apparatus in contact with sulfuric acid in concentrations of from about 50 to about 90 percent by weight which apparatus is fabricated from an alloy consisting essentially of copper in the amount of from about 1 to about 10 percent by weight, chromium in the amount of from about 15 to about 35 percent by weight, beryllium in the amount of from about 0.1 to about 0.5 percent by weight, and nickel in the amount of from about 55 to about 84 percent by weight.

2. The apparatus of claim 1 which is a container.

3. The apparatus of claim 1 which is a structural member.

4. The apparatus of claim 1 which is tubing.

5. The apparatus of claim 1 which is a mist eliminator element.

6. The apparatus of claim 1 which is a filter element.

7. The apparatus of claim 1 which is a coalescer element.

8. The apparatus of claim 1 which is screen mesh.

9. Apparatus in contact with sulfuric acid in concentrations of from about 50 to about 90 percent by weight at temperatures higher than about 175° F. and in the presence of oxygen which apparatus is fabricated from an alloy consisting essentially of copper in the amount of from about 1 to about 10 percent by weight, chromium in the amount of from about 15 to about 35 percent by weight, beryllium in the amount of from about 0.1 to about 0.5 percent by weight, and nickel in the amount of from about 55 to about 84 percent by weight.

10. A mist eliminator in contact with sulfuric acid in concentrations of from about 50 to about 90 percent by weight at temperatures higher than about 175° F. and in the presence of oxygen which apparatus is fabricated from an alloy consisting essentially of copper in the amount of from about 1 to about 10 percent by weight, chromium in the amount of from about 15 to about 35 percent by weight, beryllium in the amount of from about 0.1 to about 0.5 percent by weight, and nickel in the amount of from about 55 to about 84 percent by weight.

11. Wire mesh in contact with sulfuric acid in concentrations of from about 50 to about 90 percent by weight at temperatures higher than 175° F. and in the presence of oxygen which mesh is fabricated from an alloy consisting essentially of copper in the amount of from about 1 to about 10 percent by weight, chromium in the amount of from about 15 to about 35 percent by weight, beryllium in the amount of from about 0.1 to about 0.5 percent by weight, and nickel in the amount of from about 55 to about 84 percent by weight.

12. In a process comprising the movement of sulfuric acid in concentrations of from about 50 to about 90 percent by weight the improvement which comprises providing contact surfaces fabricated from an alloy consisting essentially of copper in the amount of from about 1 to about 10 percent by weight, chromium in the amount of from about 15 to about 35 percent by weight, beryllium in the amount of from about 0.1 to 0.5 percent by weight, and nickel in the amount of from about 55 to about 84 percent by weight.

13. The apparatus of claim 1 which is a pump part.

* * * * *